United States Patent
Tyson

(10) Patent No.: US 9,868,321 B2
(45) Date of Patent: Jan. 16, 2018

(54) METHOD FOR SEPARATING DUAL WHEELS

(71) Applicant: SUMMIT TOOL COMPANY, Akron, OH (US)

(72) Inventor: Rockford Tyson, Akron, OH (US)

(73) Assignee: Summit Tool Company, Akron, OH (US)

( * ) Notice: Subject to any disclaimer, the term of this patent is extended or adjusted under 35 U.S.C. 154(b) by 91 days.

(21) Appl. No.: 14/681,381

(22) Filed: Apr. 8, 2015

(65) Prior Publication Data

US 2016/0297240 A1   Oct. 13, 2016

(51) Int. Cl.
*B60B 29/00* (2006.01)
*B25B 28/00* (2006.01)
*B66F 3/24* (2006.01)

(52) U.S. Cl.
CPC ............ *B60B 29/008* (2013.01); *B25B 28/00* (2013.01); *B60B 29/001* (2013.01); *B60B 2320/10* (2013.01)

(58) Field of Classification Search
CPC . B60B 29/008; B60B 29/001; B60B 2320/10; B66F 3/247; B25B 28/00
See application file for complete search history.

(56) References Cited

U.S. PATENT DOCUMENTS

| | | | |
|---|---|---|---|
| 4,560,145 A | 12/1985 | Widmer | |
| 4,567,638 A * | 2/1986 | White | B60B 11/02 254/104 |
| 4,709,474 A | 12/1987 | Eckert | |
| 5,426,841 A | 6/1995 | Peterson | |
| 5,678,969 A * | 10/1997 | Farrell | B60P 7/16 410/119 |
| 2014/0007400 A1 | 1/2014 | Neto | |

* cited by examiner

*Primary Examiner* — John C Hong
(74) *Attorney, Agent, or Firm* — Renner Kenner Greive Bobak Taylor & Weber

(57) ABSTRACT

A method for removing a dual wheel from a primary wheel of a dual wheel assembly. The dual wheel is secured to the primary wheel while forming a gap between a periphery of the dual wheel and a periphery of the primary wheel. The dual wheel and the primary wheel each may have a tire mounted thereon, with the dual wheel assembly being carried on an axle. The method comprising inserting an uninflated, high pressure airbag at least partially into the gap between the dual wheel and said primary wheel; inflating the high pressure airbag to expand the gap between the dual wheel and the primary wheel so as to separate the dual wheel and the primary wheel; and finally, removing the dual wheel from the primary wheel. Likewise, a similar method can be used to remove a wheel from an axel, the wheel being carried on and secured to the axel while forming a gap between a periphery of the wheel and a periphery of the axel.

24 Claims, 5 Drawing Sheets

METHOD FOR SEPARATING DUAL WHEELS

TECHNICAL FIELD

The present invention generally relates to a method for separating dual wheel assemblies stuck or otherwise seized together. More particularly, the present invention relates to the use of a high pressure air bag to separate wheel assemblies of dual wheels that have been stuck together on dual wheel vehicles or other heavy duty vehicles.

BACKGROUND OF THE INVENTION

Dual wheels are commonly used in light duty, commercial duty, medium duty and heavy duty vehicles, including trucks and trailers, to provide greater load bearing capacity and traction. A typical dual wheel assembly comprises a pair of juxtaposed wheel rims mounted coaxially on a common hub, with each rim having a tire fitted thereon.

Wheel assemblies on dual wheel vehicles have been known to seize together from the accumulation of dirt, dust, and moisture, and from corrosion over time as well as from bonding interactions between the wheel assembly components that can occur over time from various forces and loads. The problem of seized or stuck wheel assembly components is especially common in dual wheel vehicles and other heavy duty vehicles.

When faced with the problem of stuck or seized wheel assemblies, mechanics and repair technicians generally resort to the use of a pry bar, hammer, and/or mallet to separate or loosen stuck wheel rims or other components of the wheel. Removing the seized components of dual wheels on vehicles such as heavy duty vehicles can take a significant amount of time as well as dozens of forceful hammer blows to the rotor, and occasionally requires the use of a torch to create temperature differentials across and between the seized parts. Unfortunately such techniques typically impart unevenly applied impact forces, which may deform or damage the wheel assembly components such as the hub, rotor, bearings, axle, etc. Such techniques can also result in injury to the mechanics and repair technicians.

Prior art devices or tools for removing stuck or seized wheel assembly components include Pushing devices or large pulling devices. Such devices attempt to push or pull the stuck components apart by securing the pushing or pulling devices to the wheels or the wheel assembly studs or lugs. Alternate types of dual wheel removing tools are disclosed in U.S. Pat. Nos. 4,709,474; 5,426,841, and U.S. Pat. Pub. No. 2014/0007400. Such tools and devices are not easy to use, and the forces imparted by these large pulling devices can result in deformation and damage to the studs or lugs and to the wheel assembly. Such damage usually requires replacement of the deformed and damaged parts, which adds further to the labor and maintenance costs. In addition, the cost and size of many such pulling devices or tools make it impractical to use in many repair situations.

Despite their best efforts, the technicians and mechanics often cannot avoid irreparable damage to the wheel assembly components during removal, the costs of which are borne by the vehicle owner. Thus, there is a need for a small, simple and inexpensive means to safely loosen or remove stuck or seized wheel rims from a dual wheel vehicle that is both compact in size and easy to use.

High pressure air bags are known to be used in low insertion height situations where heavy weight is needed to be lifted such as; buildings, bridges, vehicle or structural rescue, load shifting, heavy truck or aircraft recovery and machinery moving to name a few. These high pressure air bags are inserted into the low insertion area in their uninflated state and then they are inflated so as to lift up the heavy object. They have not, heretofore been used to separate wheels from one another.

SUMMARY OF THE INVENTION

In light of the foregoing, it is a first aspect of the present invention to provide a method for removing a dual wheel from a primary wheel of a dual wheel assembly. The dual wheel is secured to the primary wheel while forming a gap between the periphery of the dual wheel and the periphery of the primary wheel. The dual wheel assembly is carried on an axle. In a first step of the method, an uninflated, high pressure airbag is inserted at least partially into the gap between the dual wheel and the primary wheel. The high pressure airbag is then inflated to expand the gap between the primary wheel and the dual wheel so as to separate the dual wheel and the primary wheel. The dual wheel may then be removed from the primary wheel. In one embodiment, the dual wheel and the primary wheel each have a tire mounted thereon.

The method may further provide for removing the dual wheel from a primary wheel of a dual wheel assembly wherein the axle includes a hub and the hub is connected to the dual wheel assembly by a nut and bolt assembly that is disposed on the hub. It will be appreciated that a nut and bolt assembly may include more than one nut and bolt. In fact, for most nut and bolt assemblies disposed on hubs, anywhere from 2 to 50 nuts and bolts may be used within the nut and bolt assembly. In other embodiments from 5 to 20 nuts and bolts may be used for the nut and bolt assembly.

In one or more embodiments, the method for removing includes the nut and bolt assembly above being loosened prior to the insertion of the uninflated high pressure airbag partially between the primary wheel and the dual wheel. It will be appreciated that by loosening all of the nuts and bolts of the nut and bolt assembly, there will be a greater clearance for the gap to expand upon inflation of the high pressure air bag. It will be further appreciated that, in some embodiments, one or more of the nuts and bolts may be completely removed from the nut and bolt assembly to allow for greater clearance for the gap to expand upon inflation of the high pressure air bag. However, it will be understood that while all of the nuts and bolts of the nut and bolt assembly must be loosened, at least one nut and bolt of the nut and bolt assembly must remain and not be removed from hub for safety reasons. By keeping at least one or two nuts and bolts (and sometimes most, if not all, of the nuts and bolts) attached to the hub, the dual wheel will be prevented from coming off the axle or hub when the gap between the dual wheel and the primary wheel is expanded.

In other embodiments, the method for removing includes the nut and bolt assembly above being loosened after inserting the uninflated high pressure airbag partially between the primary wheel and the dual wheel, but prior to the inflating of the high pressure airbag to expand the gap between the primary wheel and the dual wheel so as to separate the dual wheel and the primary wheel. Again, all of the nuts and bolts of the nut and bolt assembly should at least be loosened. Some of the nuts and bolts may be removed prior to inflating the air bag, but not all of them should be removed.

In one or more embodiments, the method for removing includes both the dual wheel and the primary wheel each containing an inner rim and an outer rim. The gap may be formed between the inner rim of the dual wheel and the outer rim of the primary wheel.

In still other or the same embodiments as above, the method for removing includes inflating the high pressure airbag to expand the gap between the primary wheel and the dual wheel so as to separate the dual wheel and the primary wheel and includes expanding the airbag so it contacts and applies pressure to the inner rim of the dual wheel and the outer rim of the primary wheel.

In yet other or the same embodiments as above, the method for removing includes inflating the high pressure airbag to a pressure of between about 10 PSI and about 180 PSI.

In these and other embodiments, the high pressure airbag may be made of any material known in the art suitable for the rapid expansion of air necessary to lift or, in this case, separate a dual wheels or a wheel from an axle. One example of such a material may include aramid synthetic fibers such as are available from E. I. du Pont de Nemours & Company under the tradename Kelvar®. Other embodiments may include rayon, nylon, cotton, or other such material. In one or more embodiments, the high pressure airbag may include an air pressure line or connector attached to an air source such as a compressed air tank.

In a further embodiment, the method for removing may further include connecting an air pressure line or connector of the high pressure airbag to a source of air. In one or more embodiments the source of air used to inflate the high pressure airbag is a high pressure air pump or an air containment pressure vessel.

In a further embodiment, the method for removing may further include that before the dual wheel is removed from the primary wheel, the nut and bolt assembly must first be removed.

It is a second aspect of the present invention to provide a method for removing a wheel from an axle. The wheel is secured to the axle while forming a gap between the periphery of the wheel and the periphery of the axle. The wheel is also carried on the axle. In a first step of this method, an uninflated, high pressure airbag is inserted at least partially into the gap between the wheel and axle. The high pressure airbag is then inflated to expand the gap between the wheel and the axle so as to separate the wheel and the axle by simultaneously applying pressure to the wheel and axle. The wheel may then be removed from the axle. In one embodiment, the wheel has a tire mounted thereon.

The method may further provide for removing the wheel an axle wherein the axle includes a hub and the hub is connected to the wheel by a nut and bolt assembly that is disposed on the hub. Again, it will be appreciated that a nut and bolt assembly may include more than one nut and bolt, and likely 4 or 5 nuts and bolts or more.

In one or more embodiments, the method for removing includes the nut and bolt assembly being loosened prior to the insertion of the uninflated high pressure airbag partially between the wheel and the axle. As discussed above, while all of the nuts and bolts of the nut and bolt assembly must be loosened, at least one nut and bolt of the nut and bolt assembly must remain and not be removed from hub for safety reasons. By keeping at least one or two nuts and bolts (and sometimes most, if not all, of the nuts and bolts) attached to the hub or axle, the wheel will be prevented from coming off the axle or hub when the gap between the wheel and axle is expanded.

In other embodiments, the method for removing includes the nut and bolt assembly being loosened after inserting the uninflated high pressure airbag partially between the wheel and the axle, but prior to the inflating of the high pressure airbag to expand the gap between the wheel and the axle so as to separate the wheel and the axle. Again, all of the nuts and bolts of the nut and bolt assembly are loosened, and in some embodiments, one or more nuts and bolts may be removed, but never all of the nuts and bolts so as to prevent (for safety reasons) the wheel from being pushed off the axle by the force of the expansion of the airbag.

In yet other or the same embodiments as above, the method for removing includes inflating the high pressure airbag to a PSI of between about 10 PSI and about 180 PSI.

In further embodiments, the high pressure airbag may be made of any material known in the art suitable for the rapid expansion of air necessary to expand or, in this case, separate a wheel from an axle. One example of such a material may include aramid synthetic fibers such as are available from E. I. du Pont de Nemours & Company under the tradename Kelvar®. In one embodiment, the material is a para-aramid synthetic fiber material. Other embodiments may include rayon, nylon, cotton, or other such materials. In one or more embodiments, the high pressure airbag may include an air pressure line attached to an air source such as a compressed air tank. In one or more embodiments the source of air used to inflate the high pressure airbag is a high pressure air pump or an air containment pressure vessel.

In a further embodiment, the method for removing may further include that before the wheel is removed from the axle, the nut and bolt assembly must first be removed.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

The present invention relates to a method for removing a dual wheel from a primary wheel of a dual wheel assembly when the dual wheel is attached to the primary wheel. The method comprises inserting an uninflated, high pressure airbag at least partially into a gap between a dual wheel and a primary wheel. The high pressure airbag is then inflated so as to expand the gap between the primary wheel and the dual wheel. As the gap is expanded, the dual wheel and the primary wheel begin to separate. Once separated, the dual wheel is separated from the primary wheel.

Figure 1:
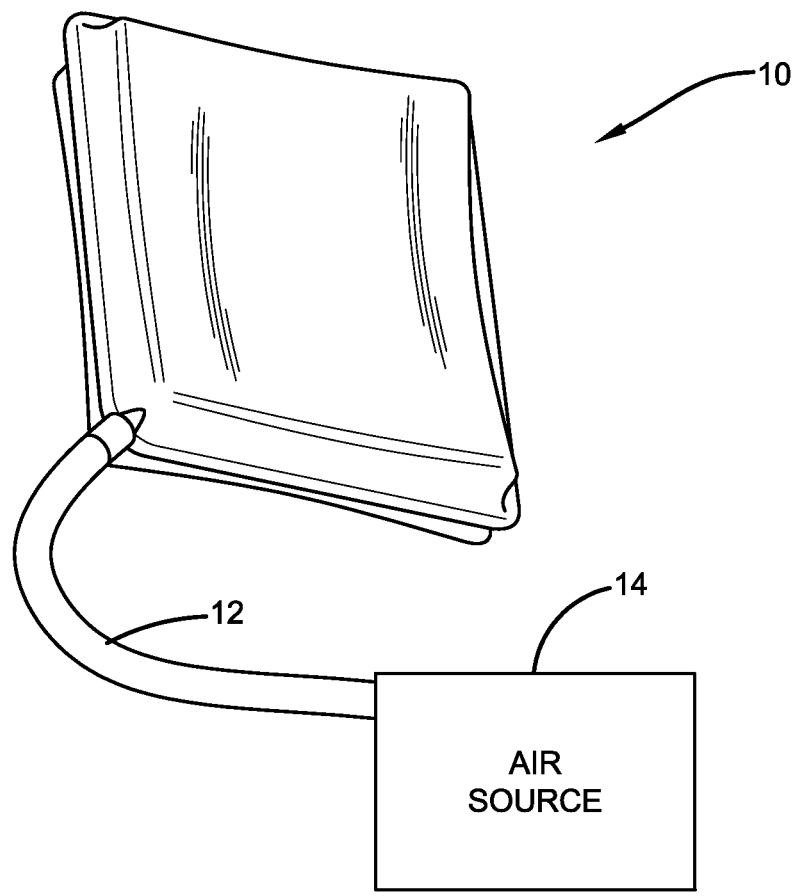
FIG. 1 is a perspective view of an uninflated, high pressure airbag of the type that is used in the present invention.

With reference to FIG. 1, a high pressure airbag 10 is shown. The high pressure airbag 10 can be made of any material known in the art suitable for the purpose of rapidly expanding under pressure so as to separate a dual wheel from a primary wheel or a wheel from an axle. In some embodiments, the material may include aramid synthetic fibers such as are available from E. I. du Pont de Nemours & Company under the tradename Kelvar®. In one embodiment, the material may be a para-aramid synthetic fiber material.

The high pressure airbag 10 is shown in its uninflated state in FIG. 1. The high pressure airbag 10 is equipped with an air pressure line 12. When the high pressure airbag 10 needs to be inflated, the air pressure line 12 is connected to an air source 14. In one embodiment of this invention, the air source 14 is selected from the group consisting of a gas (air) compressor, a hand pump, a high pressure air pump, a vacuum pump and a compressed air tank. In yet other embodiments, the air source 14 is a high pressure air pump or compressed air tank.

In some embodiments, the high pressure airbag 10 has the ability to be inflated to a pressure of between about 10 pounds per square inch (PSI) and about 200 PSI. In some embodiments, the air bag can be inflated at a slow rate over several seconds, e.g., 2 to 30 seconds or more, and more particularly, from 5 to 20 seconds or from 5 to 10 seconds. However, in most embodiments, it will be appreciated that the air bag is inflated essentially instantaneously in less than one second, and in some embodiments, in less than half of one second. In other embodiments, inflation time may be less than one fifth of one second or one tenth of one second. In many cases, the accessibility of the air bag to receive the air is determinative of the time. In other embodiments, the high pressure airbag 10 has the ability to be inflated to a pressure of between 10 PSI and 180 PSI. In yet other embodiments, the high pressure airbag 10 has the ability to be inflated to a pressure of between 10 PSI and 150 PSI. In some embodiments the high pressure airbag 10 has the ability to be inflated to a pressure of between 20 PSI and 150 PSI. In other embodiments, the high pressure airbag 10 has the ability to be inflated to a pressure of between 20 and 90 PSI.

Figure 2:
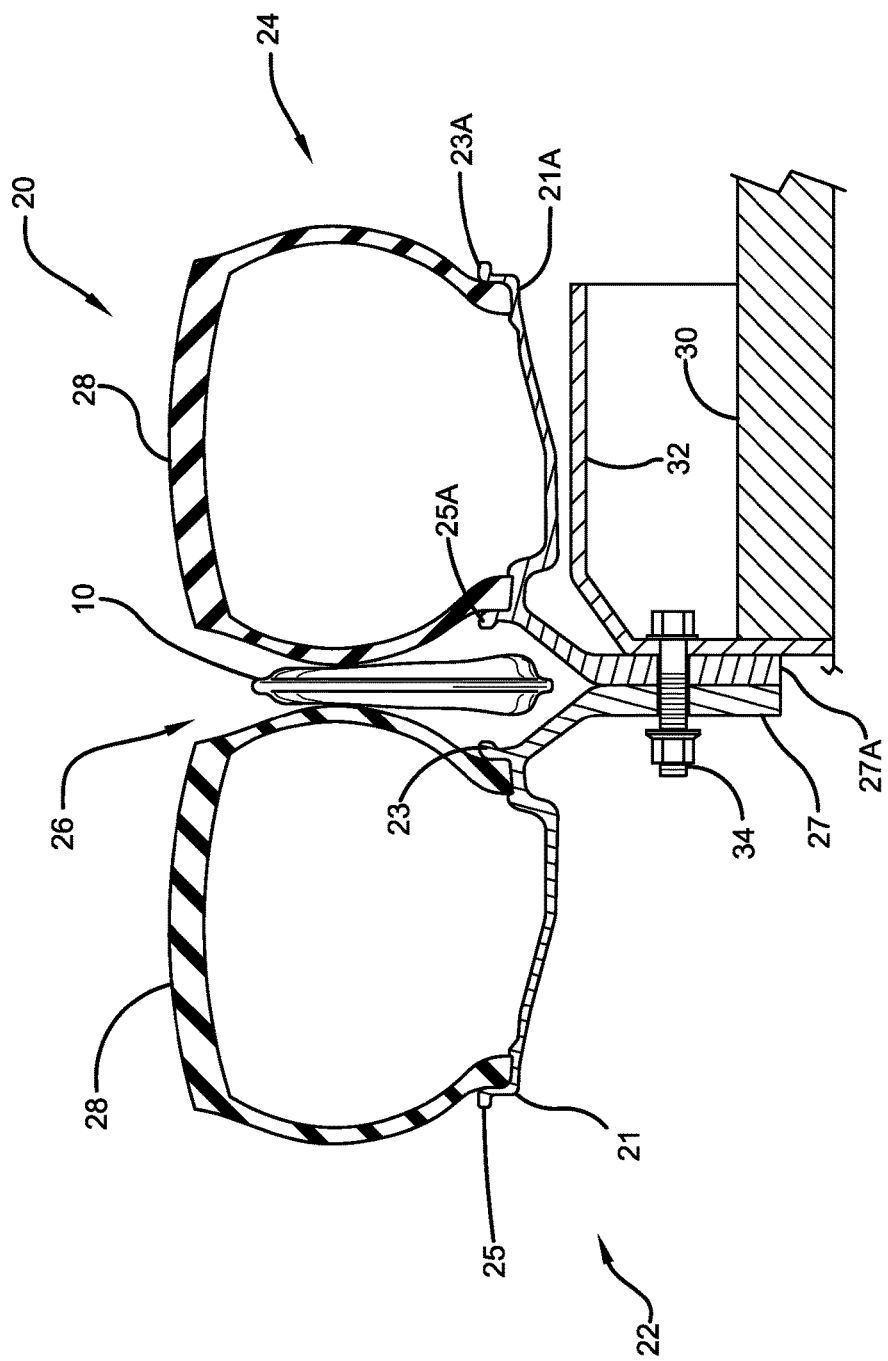
FIG. 2 is a partial sectional front elevational view of a dual wheel assembly with an uninflated, high pressure airbag being used.
Figure 3:
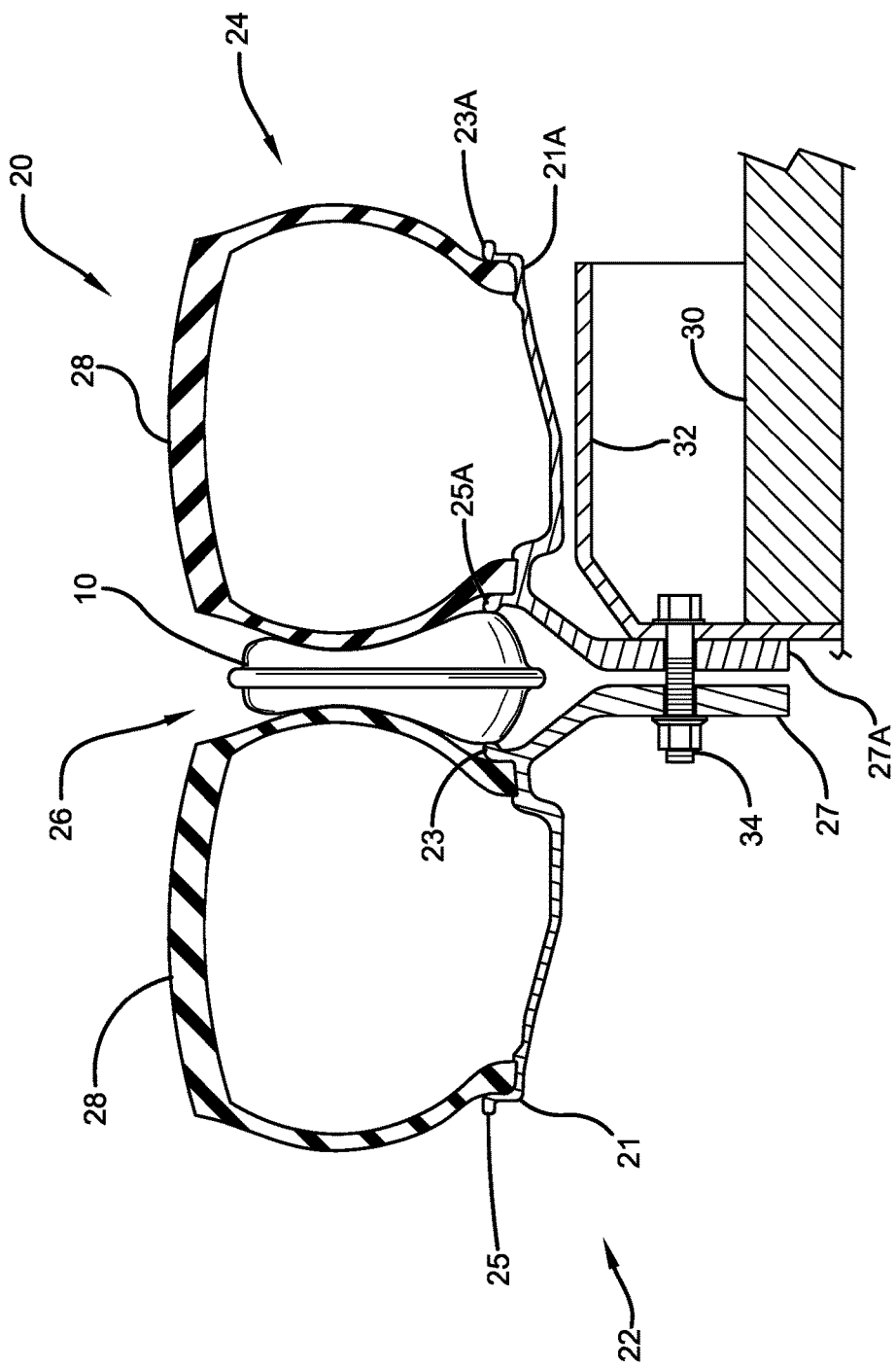
FIG. 3 is a partial sectional front elevational view of a dual wheel assembly with an inflated, high pressure airbag being used.

With reference to FIGS. 2 and 3, a dual wheel assembly 20 is shown. The dual wheel assembly 20 comprises a dual wheel 22 and a primary wheel 24. The dual wheel 22 comprises an annular portion 21 and a linear portion 27. The annular portion 21 of the dual wheel 22 comprises an inner rim 23 and an outer rim. The primary wheel 24 comprises an annular portion 21A and a linear portion 27A. The annular portion 21A of the primary wheel 24 comprises an inner rim 23A and an outer rim 25A. The linear portion 27 of the dual wheel 22 is secured to the linear portion 27A of the primary wheel 24 while forming a gap 26 between the periphery of the annular portion 21 of the dual wheel 22 and the periphery of the annular portion 21A of the primary wheel 24. In one embodiment, the gap 26 is formed between the inner rim 23 of the dual wheel and the outer rim 25A of the primary wheel. Both the dual wheel 22 and the primary wheel 24 may have a tire 28 mounted thereon and the dual wheel assembly 20 is carried on an axle 30. The axle 30 comprises a hub 32 and the hub 32 is connected to the dual wheel assembly 20 by a nut and bolt assembly 34 which is disposed on the hub 32. Although only one nut and bolt is shown as the nut and bolt assembly 34, those of skill in the art will understand that in a typical wheel and hub assembly, anywhere from 2 to 20 nuts and bolts form the nut and bolt assembly 34 that is used to connect a dual wheel assembly 20 to a hub 32.

To remove the dual wheel 22 from the primary wheel 24, the uninflated, high pressure airbag 10 is inserted at least partially into the gap 26 between the annular portion 21 of the dual wheel 22 and the annular portion 21A of the primary wheel 24, as shown in FIG. 2. Then, the high pressure airbag 10 is inflated, in many embodiments, almost instantaneously, and in other embodiments, in less than one ten of a second or less than a second, which expands the gap 26 between the annular portion 21 of the dual wheel 22 and the annular portion 21A of the primary wheel 24, which in turn applies pressure to and separates the dual wheel 22 from the primary wheel 24, as shown in FIG. 3. Finally, the dual wheel 22 is completely separated from the primary wheel 24.

In one embodiment, the method of removing the dual wheel 22 from the primary wheel 24 further comprises loosening the nut and bolt assembly 34 prior to the step of inserting the uninflated high pressure airbag 10 partially between the annular portion 21 of the dual wheel 22 and the annular portion 21A of the primary wheel 24. The nut and bolt of the nut and bolt assembly 34 is shown in FIG. 2 as being loosened. In another embodiment, the method of removing the dual wheel 22 from the primary wheel 24 further comprises loosening the nut and bolt assembly 34 after the step of inserting the uninflated high pressure airbag 10 partially between the annular portion 21 of the dual wheel 22 and the annular portion 21A of the primary wheel 24, but prior to the step of inflating the high pressure airbag 10 so as to expand the gap 26 between the annular portion 21 of the dual wheel 22 and the annular portion 21A of the primary wheel 24 so as to separate the dual wheel 22 and the primary wheel 24.

In one embodiment, the step of inflating the high pressure airbag 10 so as to expand the gap 26 between the annular portion 21 of the dual wheel 22 and the annular portion 21A of the primary wheel 24 so as to separate the dual wheel 22 from the primary wheel 24 includes expanding the airbag 10 so that the airbag 10 exerts pressure on the inner rim 23 of the dual wheel 22 and the outer rim 25A of the primary wheel 24. When the airbag 10 contacts and applies pressure to the inner rim 23 of the dual wheel 22 and the outer rim 25A of the primary wheel 24, it will cause the dual wheel 22 and the primary wheel 24 to separate, which allows for the dual wheel 22 to be easily removed from the primary wheel 24. In yet another embodiment, the step of removing the dual wheel 22 from the primary wheel 24 includes first removing the nut and bolt assembly 34, which connects the dual wheel assembly 20 to the hub 32, so that the dual wheel 22 may then be removed first, and if necessary, the primary wheel 24 may be removed.

Figure 4:
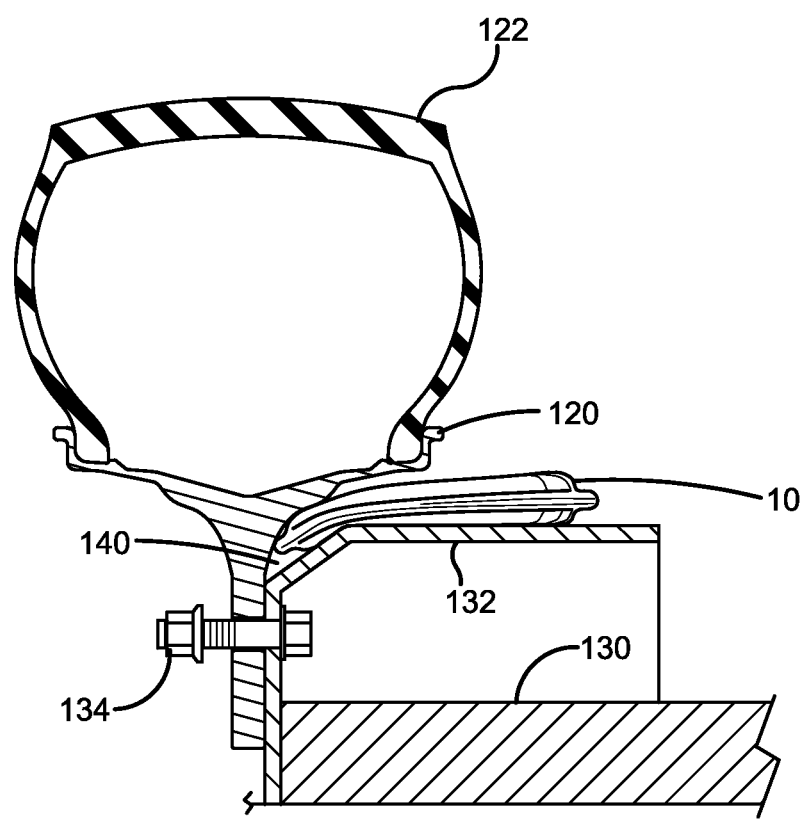
FIG. 4 is a partial sectional front elevational view of a wheel attached to an axle, with an uninflated, high pressure airbag being used.
Figure 5:
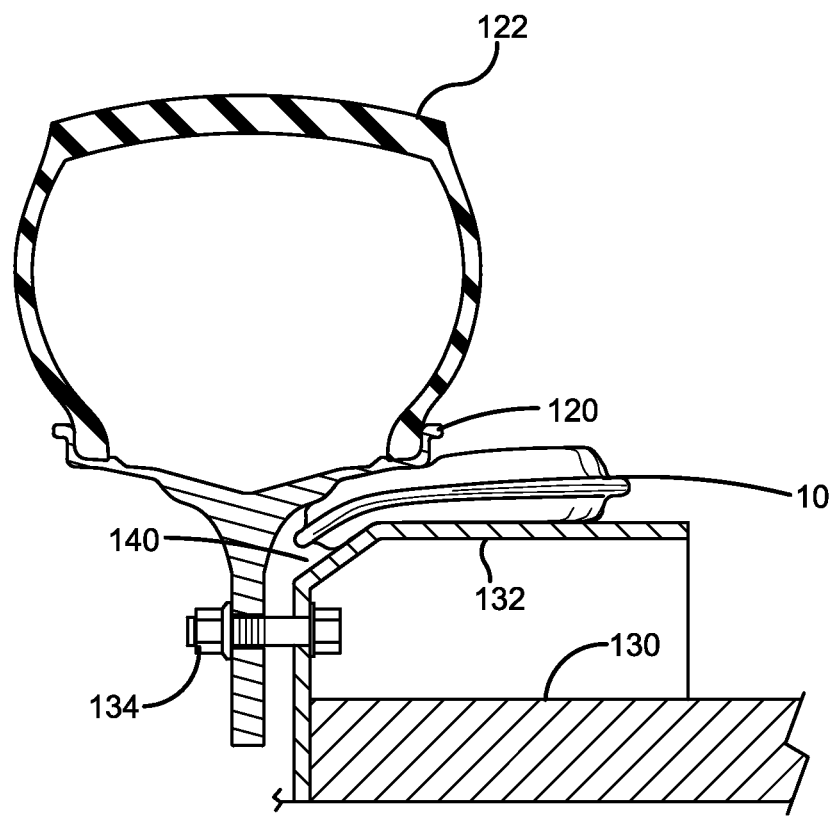
FIG. 5 is a partial sectional front elevational view of a wheel attached to an axle, with an inflated, high pressure airbag being used.

In yet another embodiment, the method can be used to remove a single wheel from an axle, as shown in FIGS. 4 and 5. In those embodiments wherein only one wheel is present, the single wheel 120 will be removed from its attachment to the axle 130 and/or housing on which the single wheel has been attached. The axle 130 comprises a hub 132 and the hub 132 is connected to the wheel 120 by a nut and bolt assembly 134 which is disposed on the hub 132. Although only one nut and bolt is shown for the nut and bolt assembly 134, those of skill in the art will understand that in a typical wheel and hub assembly, anywhere from 2 to 50 nuts and bolts will be used to connect a wheel 120 to a hub 132. In those embodiments, a gap 140 if formed between a periphery of the wheel 120 and a periphery of the axle 130, and the wheel 120 may have a tire 122 mounted thereon.

To remove the wheel 120 from the axle 130 the uninflated, high pressure airbag 10 is first inserted at least partially into the gap 140 between the wheel 120 and the axle 130, as shown in FIG. 4. In some embodiments, the airbag 10 may rest against the wheel 120 and/or axle 130 prior to inflation. Then, the high pressure airbag 10 is inflated, which expands the gap 140 between the wheel 120 and the axle 130, which in turn apples pressure to and separates the wheel 120 from the axle 130, as shown in FIG. 5. Finally, the wheel 120 is completely separated from the axle 130.

In some embodiments, the method of removing the wheel 120 from the axle 130 further comprises loosening the nut and bolt assembly 134 prior to the step of inserting the uninflated high pressure airbag 10 partially between the wheel 120 and the axle 130. The nut and bolt assembly 134 is shown in FIG. 4 as being loosened In another embodiment, the method of removing the wheel 120 from the axle 130 further comprises loosening the nut and bolt assembly 134 after the step of inserting the uninflated high pressure airbag 10 partially between the wheel 120 and the axle 130, but prior to the step of inflating the high pressure airbag 10 so as to expand the gap 140 between the wheel 120 and the axle 130 as to separate the wheel 120 and the axle 130. Again, all of the nuts and bolts of the nut and bolt assembly 34 must be loosened, but some of the nuts and bolts can be removed. However, not all of the nuts and bolts should be removed, in order to prevent the wheel from falling off the axle upon expansion of the airbag. In yet another embodiment, the step of removing the wheel 120 from the axle 130 includes first removing the nut and bolt assembly 134, which connects the wheel 120 to the hub 132, and then removing the wheel 120 from the axle 130.

In light of the foregoing, it should be appreciated that the present invention significantly advances the art by providing a method of removing a dual wheel from a primary wheel of a dual wheel assembly that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art.

For example, FIGS. 4 and 5 show using the airbag 10 to push the wheel 120 off the hub 132 of the axle 130. In the event that the airbag 10 cannot be inserted between the wheel 120 and hub 132, it could be inserted between the wheel 120 and any available portion of the framework (not shown) of the vehicle. Where a gap is too large for the airbag 10 alone to fill and push the wheel 120 away from the axle 130, cribbing, such as structural lumber (2×4s, etc.) or rubber/plastic blocks can be used to decrease the space being filled by the airbag 10. The scope of the invention shall be appreciated from the claims that follow.

What is claimed is:

1. A method for removing a dual wheel from a primary wheel of a dual wheel assembly, said dual wheel being secured to said primary wheel while forming a gap between a periphery of said dual wheel and a periphery of said primary wheel, said dual wheel assembly being carried on an axle, said method comprising:
   a. inserting an uninflated, high pressure airbag at least partially into said gap between said dual wheel and said primary wheel;
   b. inflating said high pressure airbag to expand said gap between said dual wheel and said primary wheel so as to separate the dual wheel and the primary wheel; and
   c. removing said dual wheel from said primary wheel.

2. The method of claim 1, wherein both the dual wheel and the primary wheel each have a tire mounted thereon and each comprise an annular portion and a linear portion.

3. The method of claim 2, wherein said annular portion of said dual wheel and said annular portion of said primary wheel both comprise an inner rim and an outer rim.

4. The method of claim 3, wherein the gap is formed between the inner rim of the dual wheel and the outer rim of the primary wheel.

5. The method of claim 4, wherein the step (b) of inflating said high pressure airbag to expand said gap between said dual wheel and said primary wheel so as to separate the dual wheel and the primary wheel includes expanding the airbag so that the airbag contacts the inner rim of the dual wheel and the outer rim of the primary wheel.

6. The method of claim 1, wherein said axle comprises a hub and is connected to the dual wheel assembly by a nut and bolt assembly disposed on the hub.

7. The method of claim 6, further comprising loosening the nut and bolt assembly prior to the step (a) of inserting an uninflated high pressure airbag partially between said dual wheel and said primary wheel.

8. The method of claim 6, further comprising loosening the nut and bolt assembly after the step (a) of inserting an uninflated high pressure airbag partially between said dual wheel and said primary wheel, but prior to the step (b) of inflating said high pressure airbag to expand said gap between said dual wheel and said primary wheel so as to separate the dual wheel and the primary wheel.

9. The method of claim 1, wherein the step (b) of inflating said high pressure airbag to expand said gap between said dual wheel and said primary wheel so as to separate the dual wheel and the primary wheel includes inflating said high pressure airbag to a pressure of between about 10 PSI and about 180 PSI.

10. The method of claim 1, wherein said high pressure airbag is made of an aramid synthetic fiber.

11. The method of claim 1, wherein said high pressure airbag includes an air pressure line or connector.

12. The method of claim 11, wherein the step (b) of inflating said high pressure airbag to expand said gap between said dual wheel and said primary wheel so as to separate the dual wheel and the primary wheel includes first connecting said air pressure line or connector to a source of air.

13. The method of claim 11, wherein the source of air is a high pressure air pump or compressed air tank.

14. The method of claim 1, wherein the step (c) of removing said dual wheel from said primary wheel includes first removing the nut and bolt assembly.

15. A method for removing a wheel from an axel, said wheel being carried on and secured to said axel while forming a gap between a periphery of said wheel and a periphery of said axel, said method comprising:
   a. inserting an uninflated, high pressure airbag at least partially into said gap between said wheel and said axel;
   b. inflating said high pressure airbag to expand said gap between said wheel and said axel so as to separate the wheel and the axel; and
   c. removing said wheel from said axel.

16. The method of claim 15, wherein said axle comprises a hub and is connected to said wheel by at least one nut and bolt assembly disposed on the hub.

17. The method of claim 16, further comprising loosening the at least one nut and bolt assembly prior to the step (a) of inserting an uninflated high pressure airbag partially between said wheel and said axel.

18. The method of claim 16, further comprising loosening the at least one nut and bolt assembly after the step (a) of inserting an uninflated high pressure airbag partially between said wheel and said axel, but prior to the step (b) of inflating said high pressure airbag to expand said gap between said wheel and said axel so as to separate the wheel and the axel.

19. The method of claim 15, wherein the step (b) of inflating said high pressure airbag to expand said gap between said wheel and said axel so as to separate the wheel and the axel includes inflating said high pressure airbag to a pressure of between about 10 PSI and about 180 PSI.

20. The method of claim 15, wherein said high pressure airbag is made of an aramid synthetic fiber.

21. The method of claim 15, wherein said high pressure airbag includes an air pressure line or connector.

22. The method of claim 21, wherein the step (b) of inflating said high pressure airbag to expand said gap between said wheel and said axel so as to separate the wheel and the axel includes first connecting said air pressure line or connector to a source of air.

23. The method of claim 22, wherein the source of air is a high pressure air pump or compressed air tank.

24. The method of claim 15, wherein the step (c) of removing said wheel from said axel includes first removing the nut and bolt assembly.

* * * * *